United States Patent
Brown (10) Patent No.: US 9,043,257 B1
(45) Date of Patent: *May 26, 2015

(54) OBSERVATION-BASED USER PROFILING AND PROFILE MATCHING

(71) Applicant: Invent.ly, LLC, Woodside, CA (US)

(72) Inventor: Stephen J. Brown, Woodside, CA (US)

(73) Assignee: Invent.ly, LLC, Woodside, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 13/920,335

(22) Filed: Jun. 18, 2013

Related U.S. Application Data (63) Continuation of application No. 13/442,157, filed on Apr. 9, 2012, now Pat. No. 8,473,440, which is a continuation of application No. 12/215,957, filed on Jun. 30, 2008, now Pat. No. 8,156,064, which is a continuation-in-part of application No. 11/999,249, filed on Dec. 3, 2007, now Pat. No. 8,533,269.

(60) Provisional application No. 60/948,157, filed on Jul. 5, 2007.

(51) Int. Cl.
*G06F 17/00* (2006.01)
*G06N 5/00* (2006.01)
*H04L 29/08* (2006.01)

(52) U.S. Cl.
CPC .................................. *H04L 67/306* (2013.01)

(58) Field of Classification Search
None
See application file for complete search history.

(56) References Cited

U.S. PATENT DOCUMENTS

| | | | |
|---|---|---|---|
| 6,594,673 B1 | 7/2003 | Smith et al. | |
| 7,117,254 B2 | 10/2006 | Lunt et al. | |
| 7,167,910 B2 | 1/2007 | Farnham et al. | |
| 7,188,153 B2 | 3/2007 | Lunt et al. | |
| 7,720,855 B2 | 5/2010 | Brown | 707/758 |
| 7,925,743 B2 | 4/2011 | Neely et al. | 709/224 |
| 8,024,317 B2 * | 9/2011 | Nair et al. | 707/709 |
| 8,032,508 B2 * | 10/2011 | Martinez et al. | 707/708 |
| 8,060,492 B2 * | 11/2011 | Nair et al. | 707/709 |
| 8,096,477 B2 | 1/2012 | Brown et al. | 235/462.09 |
| 8,156,064 B2 | 4/2012 | Brown | 706/46 |

(Continued)

OTHER PUBLICATIONS

Building a topic hierarchy from a data stream for conceptualizing user interest profiles Hyun Namgoong ; Kang Yong Lee ; Kee Seong Cho ; Jinuk Jung ; Hong-Gee Kim ICT Convergence (ICTC), 2012 International Conference on DOI: 10.1109/ICTC.2012.6386832 Publication Year 2012 , pp. 253-254.*

(Continued)

*Primary Examiner* — Michael B Holmes
(74) *Attorney, Agent, or Firm* — Christopher P. Maiorana, PC (57) ABSTRACT

Observation-based user profiling and profile matching are provided. The network behavior of users of a computer-implemented social network are observed and used for user profiling. By observing network behavior instead of necessarily relying on user self-reported data, accurate and objective user profiles can be formed; user profiling is accomplished based on the observed network behaviors with or without the knowledge of the user being profiled. The observed network behaviors can include the customization of a visual graphic, a media preference, a communication preference, or a selection of words from a word list. The user profiles can be with respect to a domain and two or more users can be matched based on their profiles with respect to the same domain. User ratings and profile updating based on the ratings are also provided.

19 Claims, 7 Drawing Sheets

(56) References Cited

U.S. PATENT DOCUMENTS

| | | | |
|---|---|---|---|
| 8,200,757 B2 | 6/2012 | Brown et al. | 709/204 |
| 8,224,714 B2 | 7/2012 | Yost | 705/26.7 |
| RE44,559 E * | 10/2013 | Flinn et al. | 706/12 |
| 8,600,920 B2 * | 12/2013 | Flynn et al. | 706/45 |
| RE44,966 E * | 6/2014 | Flinn et al. | 706/12 |
| RE44,967 E * | 6/2014 | Flinn et al. | 706/12 |
| RE44,968 E * | 6/2014 | Flinn et al. | 706/12 |
| 8,887,286 B2 * | 11/2014 | Dupont et al. | 726/25 |
| 2004/0088325 A1 | 5/2004 | Elder et al. | |
| 2007/0174389 A1 | 7/2007 | Armstrong et al. | |
| 2008/0005076 A1 | 1/2008 | Payne et al. | |
| 2008/0103907 A1 | 5/2008 | Maislos et al. | |
| 2008/0126318 A1 | 5/2008 | Frankovitz | |
| 2008/0126928 A1 | 5/2008 | de Leon et al. | |
| 2009/0144639 A1 | 6/2009 | Nims et al. | |

OTHER PUBLICATIONS

Wireless contacts, Facebook friendships and interests: Analysis of a multi-layer social network in an academic environment Socievole, A. ; De Rango, F. ; Caputo, A. Wireless Days (WD), 2014 IFIP DOI: 10.1109/WD.2014.7020819 Publication Year: 2014 , pp. 1-7.*

Toward ontology-based personalization of a recommender system in social network Kadima, H. ; Malek, M. Soft Computing and Pattern Recognition (SoCPaR), 2010 International Conference of DOI: 10.1109/SOCPAR.2010.5685957 Publication Year: 2010 , pp. 119-122.*

Toward inferring the age of Twitter users with their use of nonstandard abbreviations and lexicon Moseley, N. ; Alm, C.O. ; Rege, M. Information Reuse and Integration (IRI), 2014 IEEE 15th International Conference on DOI: 10.1109/IRI.2014.7051893 Publication Year: 2014 , pp. 219-226.*

* cited by examiner

FIG. 1

|     | $D_1$ | $D_2$ | $D_3$ | ... | $D_N$ |
| --- | --- | --- | --- | --- | --- |
| $NB_1$ | $SF_{11}$ | $SF_{12}$ | $SF_{13}$ | ... | $SF_{1N}$ |
| $NB_2$ | $SF_{21}$ | $SF_{22}$ | $SF_{23}$ | ... | $SF_{2N}$ |
| $NB_3$ | $SF_{31}$ | $SF_{32}$ | $SF_{33}$ | ... | $SF_{3N}$ |
| ⋮ | ⋮ | ⋮ | ⋮ | ⋮ | ⋮ |
| $NB_M$ | $SF_{M1}$ | $SF_{M2}$ | $SF_{M3}$ | ... | $SF_{MN}$ |
|     | ↓ | ↓ | ↓ |     | ↓ |
|     | $P(D_1)$ | $P(D_2)$ | $P(D_3)$ |     | $P(D_N)$ |

OBSERVATION-BASED USER PROFILING AND PROFILE MATCHING

CROSS-REFERENCE TO RELATED APPLICATIONS

This application relates to U.S. Ser. No. 13/442,157, filed Apr. 9, 2012, now U.S. Pat. No. 8,473,440, which is a continuation of U.S. Ser. No. 12/215,957, filed Jun. 30, 2008, now U.S. Pat. No. 8,156,064, which (i) relates to U.S. Provisional Application No. 60/948,157, filed Jul. 5, 2007 and (ii) is a continuation-in-part of U.S. Ser. No. 11/999,249, filed Dec. 3, 2007, now U.S. Pat. No. 8,533,269, each of which is incorporated by reference in their entirety.

FIELD OF THE INVENTION

The invention relates generally to social networks. More particularly, the present invention relates to user profiling and profile matching in a computer-implemented social network.

BACKGROUND OF THE INVENTION

Many Internet-based or web-based social networks are powerful tools to connect people separated by potentially vast distances. Social networks currently allow users to build a user profile and connect to friends whom the user may or may not already know from other social means. Some existing social networks, particularly dating websites, offer suggestions to their users for possible matches with other users. Typically, these matches are suggested based on characteristics provided in the user profiles.

User matching found in existing web-based social networks, however, suffer from the fact that they rely on user self-reported data to build a user profile. For example, dating websites typically provide surveys for their users to fill out. The surveyed users are then matched with suggested counterparts based on the survey data. With user profiles strictly reliant on self-reported data, users can easily provide an inaccurate portrayal of themselves. In other words, users are likely to game the system to attempt to look better or different than their actual selves. Since users are matched based on their profiles, inaccurate user profiles would naturally lead to improper or imperfect matches.

Furthermore, the user surveys provided by existing social networks typically ask the users to answer direct questions related to a particular subject. Therefore, the surveys are only relevant to one or a small number of topics or subjects and can be completely useless for user profiling with respect to other topics. In this scenario, additional user surveys may be required when the social network attempts to match users for other purposes. The additional surveys would be an annoyance to the users of the social network. For the example of dating websites, the user surveys generally contain questions related to particular romantic interests of the user. Though these questions may be relevant to dating, they may be completely irrelevant for another purpose, such as a community service event.

The present invention addresses at least the difficult problems of user profiling and profile matching.

SUMMARY OF THE INVENTION

The present invention is directed to profiling and profile matching based on observed network behavior. An application server operates a computer-implemented social network of users. One or more network behaviors of at least some of the users of the social network are observed. A network behavior can include a customization of a visual graphic by the observed user, a media preference of the observed user, a communication preference of the observed user, or any combination thereof. The observed network behaviors can be stored in a database.

Observed users are profiled based on the network behaviors, where the profiling is with respect to one or more domains, such as a romantic interaction, a transportation organization, an exercise goal, a fitness goal, a diet regimen, a smoking habit, an addiction, a cause, a community service, a physical activity, an emotional state, or any combination thereof. Two or more of the profiled users can be matched with respect to the same domain based on the user profiles.

In a preferred embodiment, the user profiling includes associating one or more scale factors for each of the observed network behaviors. The scale factor associating is based on a relevance of an observed network behavior to the domain used in profiling. In an embodiment, a rating function is also provided for rating the profile matching. The rating can be based on one or more user inputs of the matched profiled users, a participation data of the matched profiled users, or any combination thereof. The ratings can be used to update the user profiles and/or profile matches. In a preferred embodiment, the scale factors are refined based on the ratings.

In an embodiment, an observed network behavior includes the customization of an avatar, including determining the appearance of the avatar. Another observed network behavior includes media preference, where the media preference is associated with a media content, a media type, a frequency of media playback or any combination thereof. An observed network behavior can also include a communication preference, including a communication method, a communication timing, a communication frequency, or any combination thereof. In an embodiment, a network behavior also includes a selection of words from a word list by the observed user, where the words are associated with a value, a need, a goal, or any combination thereof.

BRIEF DESCRIPTION OF THE DRAWINGS

The present invention together with its objectives and advantages will be understood by reading the following description in conjunction with the drawings, in which.

DETAILED DESCRIPTION OF THE PREFERRED EMBODIMENTS

Accurately profiling individuals can be a difficult task. In computer-implemented social networks, self-reported data are often used to profile individuals and, possibly, match multiple individuals based on the profiles. However, self-reported data can be highly inaccurate due to their reliance on the objectivity of the reporting individuals. The present invention is directed to profiling and profile matching based on observed network behavior of users of a computer-implemented social network.

Figure 1:
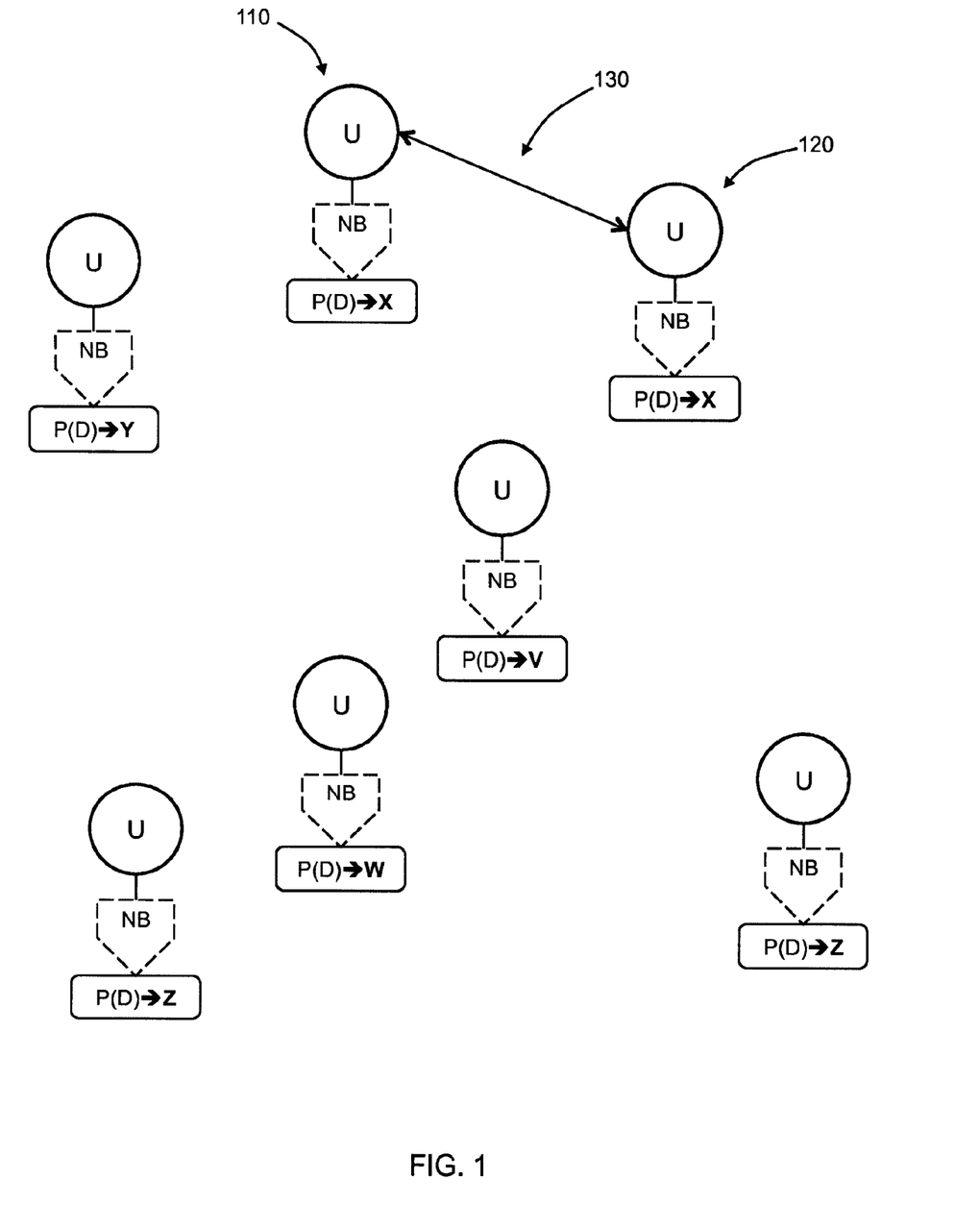
FIG. 1 shows an example of matching users U of a computer-implemented social network based on profiles P(D) from observed network behavior NB according to the present invention.

FIG. 1 shows an example of a computer-implemented social network of users U. An application server operates the social network over a communication network, such as the Internet. In an embodiment, each user U of the social network is able to communicate, or otherwise interact, with at least another user U of the social network. In certain embodiments, each user has a list of friends who may also be users of the social network.

It is important to note that the users U of the social network can perform one or more network behaviors NB, including a customization of a visual graphic, a media preference, and a communication preference. The network behaviors NB can be observed and stored in a database. The network behavior NB is used to profile each of the observed users U. In a preferred embodiment a profile P(D) is generated with respect to one or more domains D. The domain D can be related to a romantic interaction, a transportation organization, an exercise goal, a fitness goal, a diet regimen, an addiction, a smoking habit, a cause, a community service, a physical activity, an emotional state, or any combination thereof. The profile P(D) of each user U is generated by a profiling function based on the observed network behavior NB.

In a preferred embodiment, the profiles P(D) of the observed users U are used to match two or more compatible users with respect to the domain D. In FIG. 1, user 110 and user 120 both have profiles P(D) related to X. Due to this relation, a matching function can match user 110 and user 120 with respect to the domain D. In an embodiment, the purpose of profile matching can be related to certain goals, needs, or interests of the users. For example, users can be matched to find a carpool partner, to find an exercise partner, to find a support group for diet, weight loss, smoking, or another addiction, or to find a cause or community service activity. In other embodiments, matched users can be communicatively connected, such as by email, telephone, instant messaging, video chatting, and/or in person. For computer-implemented social networks where each user has a friends list, matching can be used to add friends to the friends list.

Figure 2:
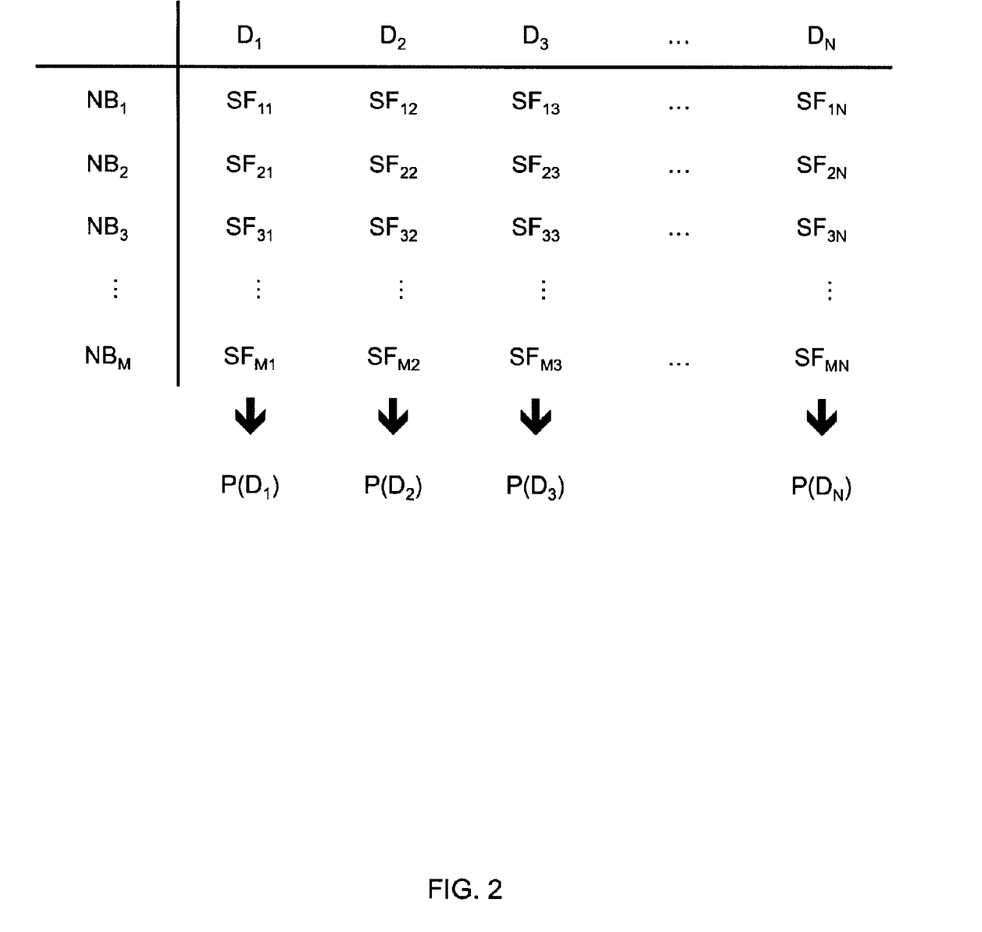
FIG. 2 shows a matrix of scale factors SF for domains D and network behaviors NB according to the present invention.

In a preferred embodiment of the present invention, the profiling function associates one or more scale factors for each of the observed network behaviors NB. The scale factors are associated based on a relevance of the observed network behavior NB to the domain D. FIG. 2 shows a matrix of scale factors SF for the domains D and the network behaviors NB for one of the users. In particular, an element of the matrix SF.sub.ij can be related to the relevance of NB.sub.i with respect to domain D.sub.j. As shown in FIG. 2, a user profile P(D.sub.j) with respect to domain D.sub.j is generated based on the scale factors SF in the column of domain D.sub.j.

A network behavior NB may be directly relevant, indirectly relevant, partially relevant, or irrelevant to a particular domain D. For example, music preferences may be important to profiling and profile matching users for a carpool, but not relevant to another domain. In contrast, values and ideals may be important to profiling users to join a cause, but not with matching users for a carpool. In another example, personality types, such as leader versus follower, risk taker versus conservative, may be relevant for user profiling in a support group for changing lifestyle and behavior, such as a weight loss or smoking cessation program. In an embodiment, the magnitudes of the scale factors SF represent the relevancy of the network behavior NB with respect to a domain. The use of observed network behaviors NB enables profiling and profile matching for any number of domains D without necessarily requiring domain-specific input.

It is important to note that a network behavior is observed for a purpose of profiling one or more characteristics of a user without necessarily relying on user-reported data relating to the same characteristics. By not relying on user-reported data, the user cannot alter or game his or her profile by providing dubious information used in profiling. In fact, the user may not even be aware of how the observed network behavior is used for profiling.

Figure 3:
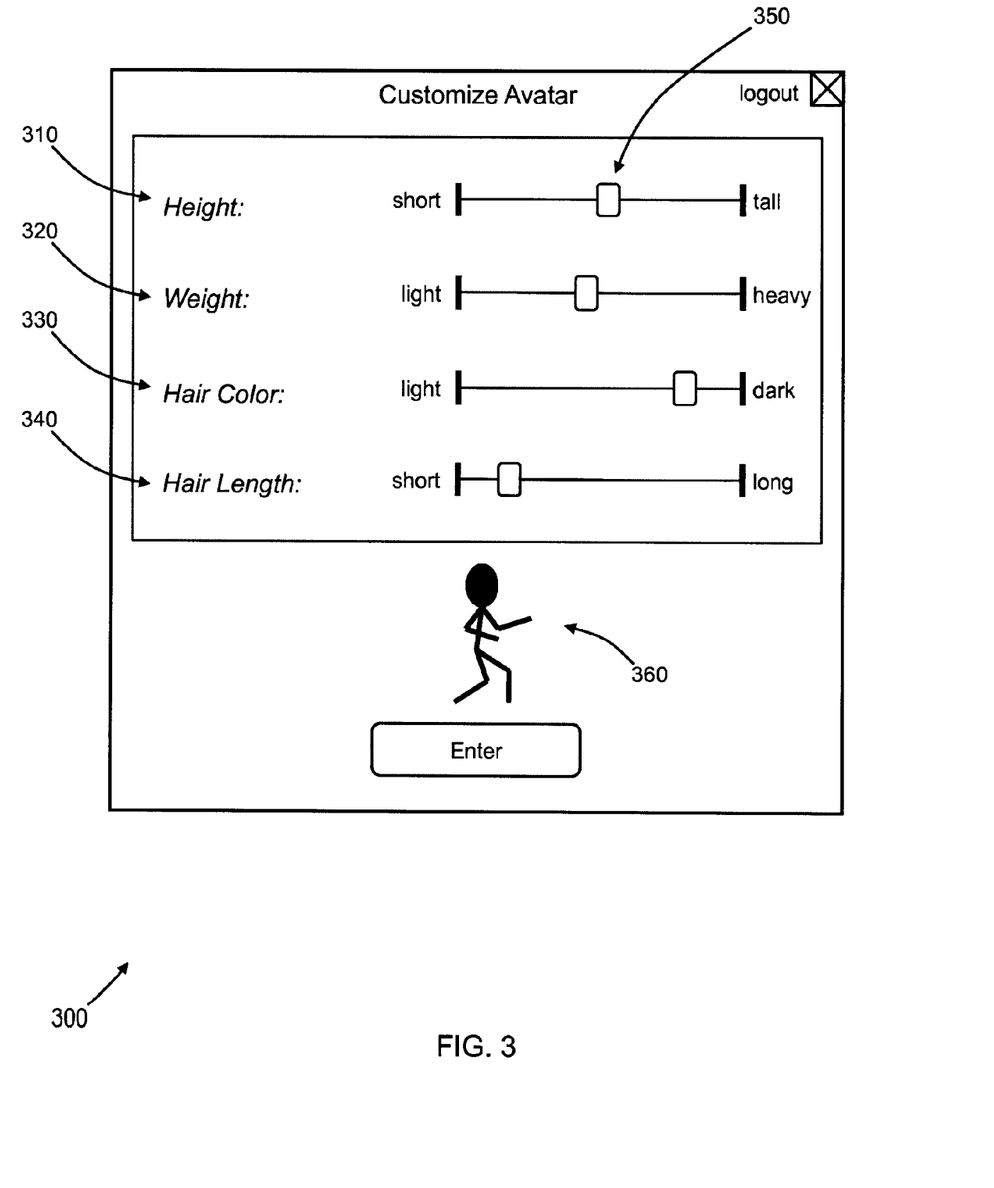
FIG. 3 shows an example function for customizing an avatar according to the present invention.

In a preferred embodiment, a network behavior can include a customization or creation of a visual graphic, such as an avatar, an icon, or any visual representation. FIG. 3 shows an example customizing function 300 for users of a social network to customize an avatar 360. The customizing function 300 allows a user to adjust apparent physical traits of the avatar 360, such as height 310, weight 320, hair color 330, and hair length 340. In an embodiment, the user is offered a selection of choices for the avatar look and clothing. Creating an avatar's look and feel can reveal user preferences, such as gender, gender-related preferences, style, and attitude, without explicitly asking the user. Though the customizing function 300 shows a toggle 350 for adjusting the properties of the physical traits, other methods of customizing the appearance of the avatar 360 can be employed, such as dragging and dropping desired characteristics onto the avatar 360 or visual graphic.

The observed network behavior can also include user media preference. In an embodiment, the media preference is associated with media content, media type, frequency of media playback, or any combination thereof. The media content can include music, movies, television shows, and other audio-visual media. The media preferences can be extracted from the media player operated by the user or by user-entry. In addition, one or more behavioral characteristic, such as early adopter behavior or openness to new experience, can be determined based on timing, source, and means of media purchases. For example, information relating to whether or not the media was discovered originally by the user or through friends of the user can be used to measure attributes about the user. Similarly, information relating to the time after release of the media may be pertinent to certain domains and behavioral characteristics.

In an embodiment, the observed network behavior includes one or more communication preferences of the user. The communication preferences include communication methods, such as email, telephone, voice mail, and text messaging, communication timing, communication frequency, or any combination thereof. In an embodiment, communication timing and frequency includes when and how often each communication method is used, the length of time to respond to voice mails, emails, and other forms of messaging, and the length of time messages are left in the mail box. The above communication preferences can also be used to determine one or more user behavioral patterns and personality types. For example, user preference and frequency for video chatting, text messaging, email, or telephone can help to predict the technological acumen of a user. The timing of communications can also help to determine if the user generally functions in the early morning or late at night.

Figure 4:
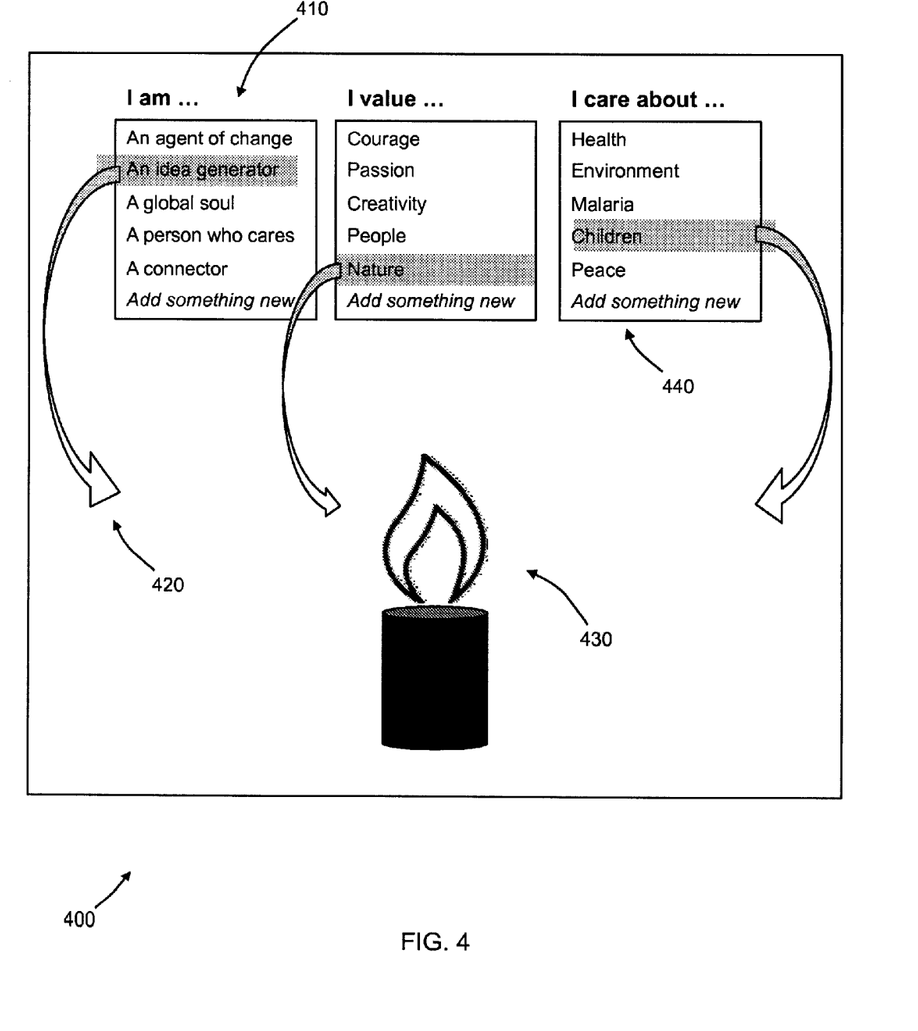
FIG. 4 shows an example word selection as an example network behavior for observation according to the present invention.

In another embodiment of the present invention, the observed network behaviors include a selection of words by a user from a word list. The words available for selection can be associated with values, needs, goals, or any combination thereof. FIG. 4 shows an example of lists of words 410 available for selection to describe properties of a selecting user. In a preferred embodiment, word selection occurs when a user drags one or more words from the word list 410 to an icon, such as a candle 430. Other methods of selecting words, such as text boxes, can also be employed. Optionally, a user can also add new words 440 to the word lists.

Figure 5:
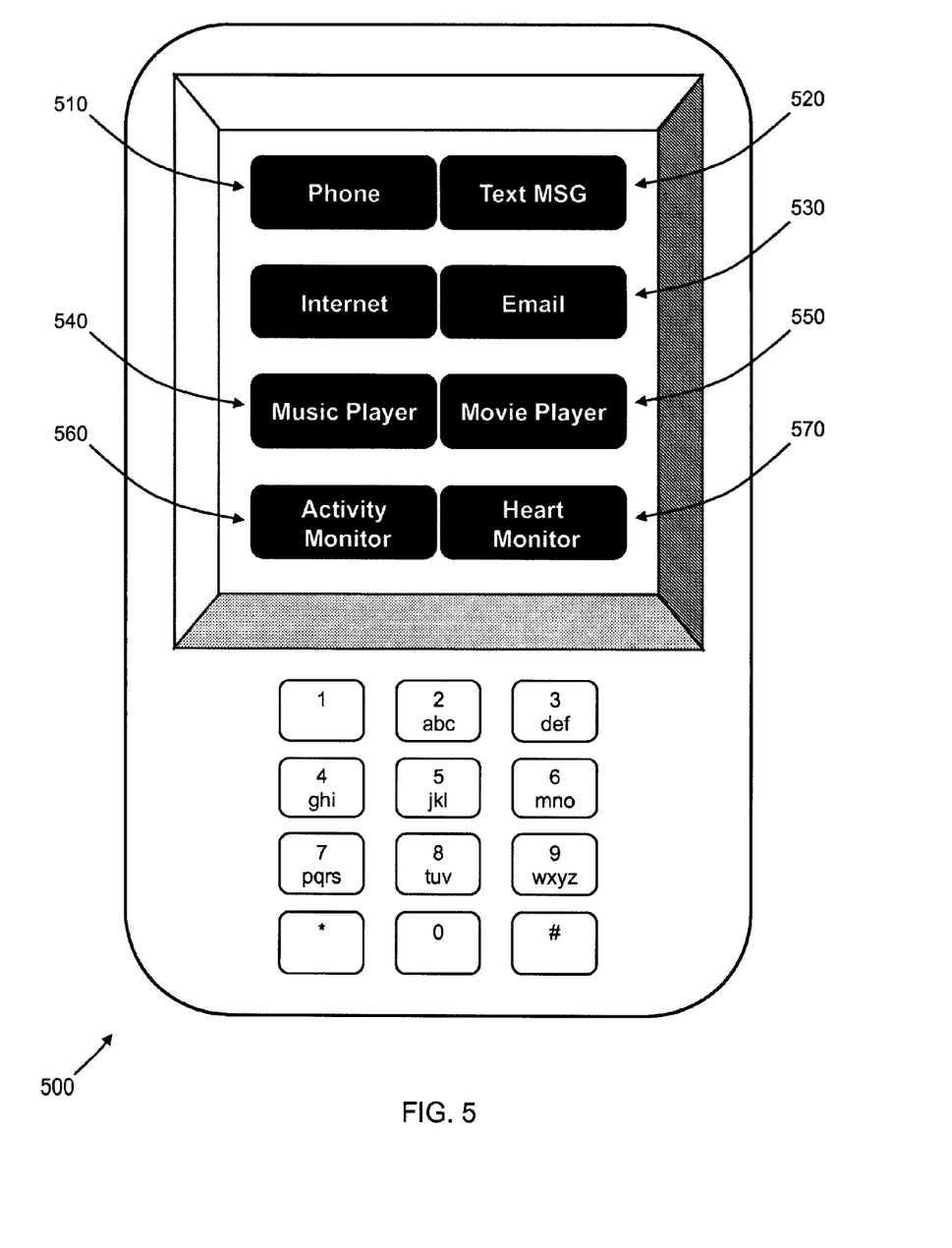
FIG. 5 shows an example of a portable communication device where user network behavior can be observed according to the present invention.

An embodiment of the present invention is directed to observing network behaviors associated with a handheld communication device and at least partially profiling users based on the observed network behaviors on the handheld communication device. FIG. 5 shows an example of a handheld communication device 500 according to the present invention. The handheld communication device 500 can be any portable device capable of communicating with the network, including the application server operating the computer-implemented social network. For example, a handheld communication device 500 can include a mobile phone 510, a network-integrated mobile phone, such as the iPhone by Apple Computers (Cupertino, Calif., USA), a personal digital assistant, a laptop computer, a medical device, a wristwatch, an exercise device, a health monitor 570, a media player, a music player 540, a movie player 550, an mp3 player, or any combination thereof.

In an embodiment, network behaviors on the handheld communication device 500 to be observed include the above-described communication preferences, such as communication methods, timing, and frequency. Communication methods can include phone 510, text messaging 520, and electronic mail 530. In an embodiment with a mobile phone handheld communication device 500, ring tone selection and the assignment of ring tones to individuals can also be observed and used for user profiling and profile matching.

In certain embodiments, the handheld communication device 500 can also include media playing capabilities 540-550. The observed network behaviors on the handheld communication device 500 can include the media preferences described above. In particular, user media preferences are observed from media content stored and/or media playback by the handheld communication device 500.

Many portable communication devices, such as mobile phones, have location-aware, activity-aware 560, and/or motion-aware technology. In an embodiment, network behaviors based on location-awareness, activity-awareness, and/or motion-awareness of the user carrying the portable communication device can be observed and used for user profiling and profile matching. In particular, a portable communication device 500 can include an accelerometer, a GPS device, a heart monitor 570, or any device capable of detecting user activity. User activity can be observed and communicated to a profiling function for profiling the user. For example, the speed and distance a user runs and the media preferences of the user while running or undergoing an activity can be observed and used to profile the user. The profiles can be used for user profile matching. Further descriptions of example portable communication devices having activity-detection and network communication capabilities usable in embodiments of the present invention can be found in U.S. patent application Ser. No. 11/999,249 filed on Dec. 3, 2007, which is hereby incorporated by reference in its entirety.

It is important to note that in a preferred embodiment, the user profiles are not static. In particular, the scale factors are updatable; therefore the profiles with respect to one or more domains can change. Changes to user profiles and/or scale factors can be caused by additional observed network behaviors or changes to past network behaviors. In addition, changes to user profiles can occur due to updates to the relevancy of one or more network behaviors with respect to a domain. In fact, the relevancy updates of the network behaviors can cause changes to user profiles and/or scale factors with or without any additions or changes to the network behaviors of the observed users. The relevance of a network behavior with respect to a domain can be updated by network activity of one or more users of the social network, or by cumulative activity of some or all of the users of the social network.

Figure 6:
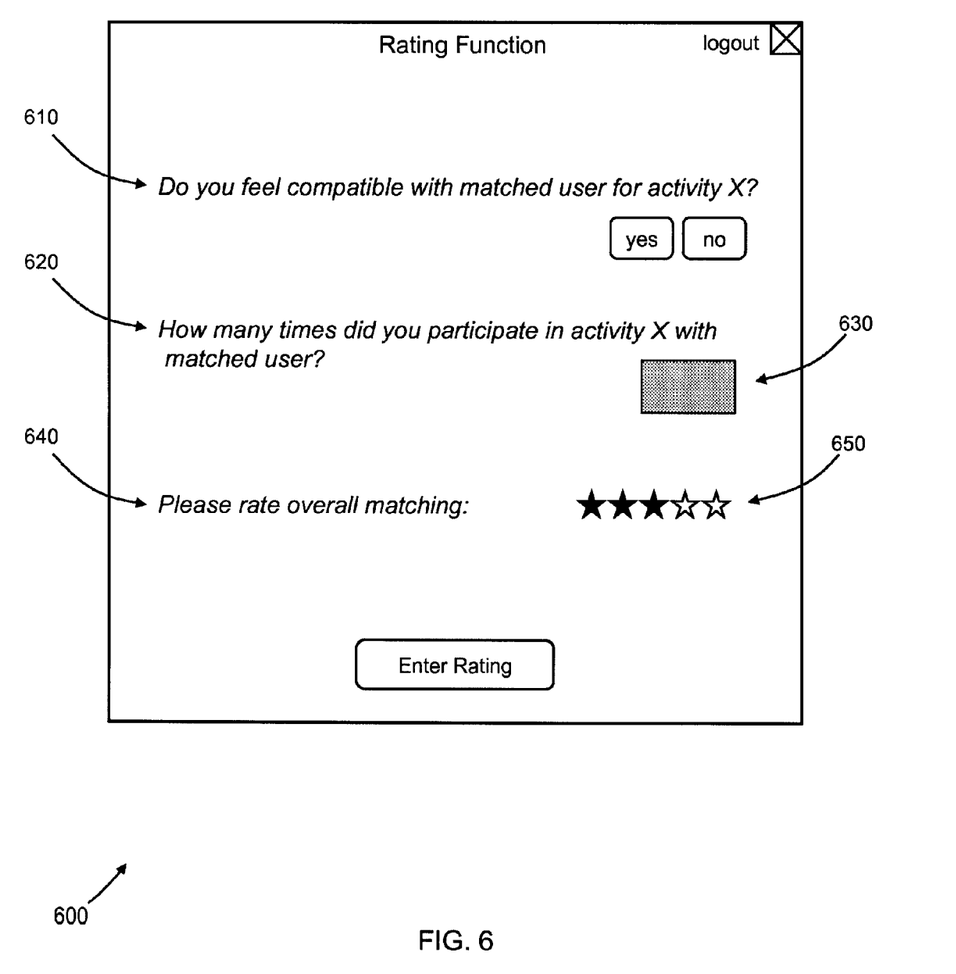
FIG. 6 shows an example of a rating function including user input and participation data according to the present invention.

In a preferred embodiment, a rating function is provided for users to rate the quality of the profiling and/or the profile matching. An example rating function 600 is shown in FIG. 6. In an embodiment, the rating function 600 can be accessed on a handheld communication device, In particular, the ratings can be based on one or more user inputs and user surveys. For example, a user can be matched with one or more other users with respect to activity X, such as for carpooling. The rating function 600 allows the user to rate his or her compatibility with the matched users 610 or rate the overall profile matching 640. Ratings can include alphanumeric metrics, a metric of symbols, such as a number of stars 650, or any other type of rating metric.

The rating function can also include participation data 620. The participation data can be derived from user input 630. Alternatively or additionally, the participation data can be observed without user input. In an embodiment, the cancellation of the participation of matched users for an activity or the churn rate of matched users can be used to rate the profile matching.

Figure 7:
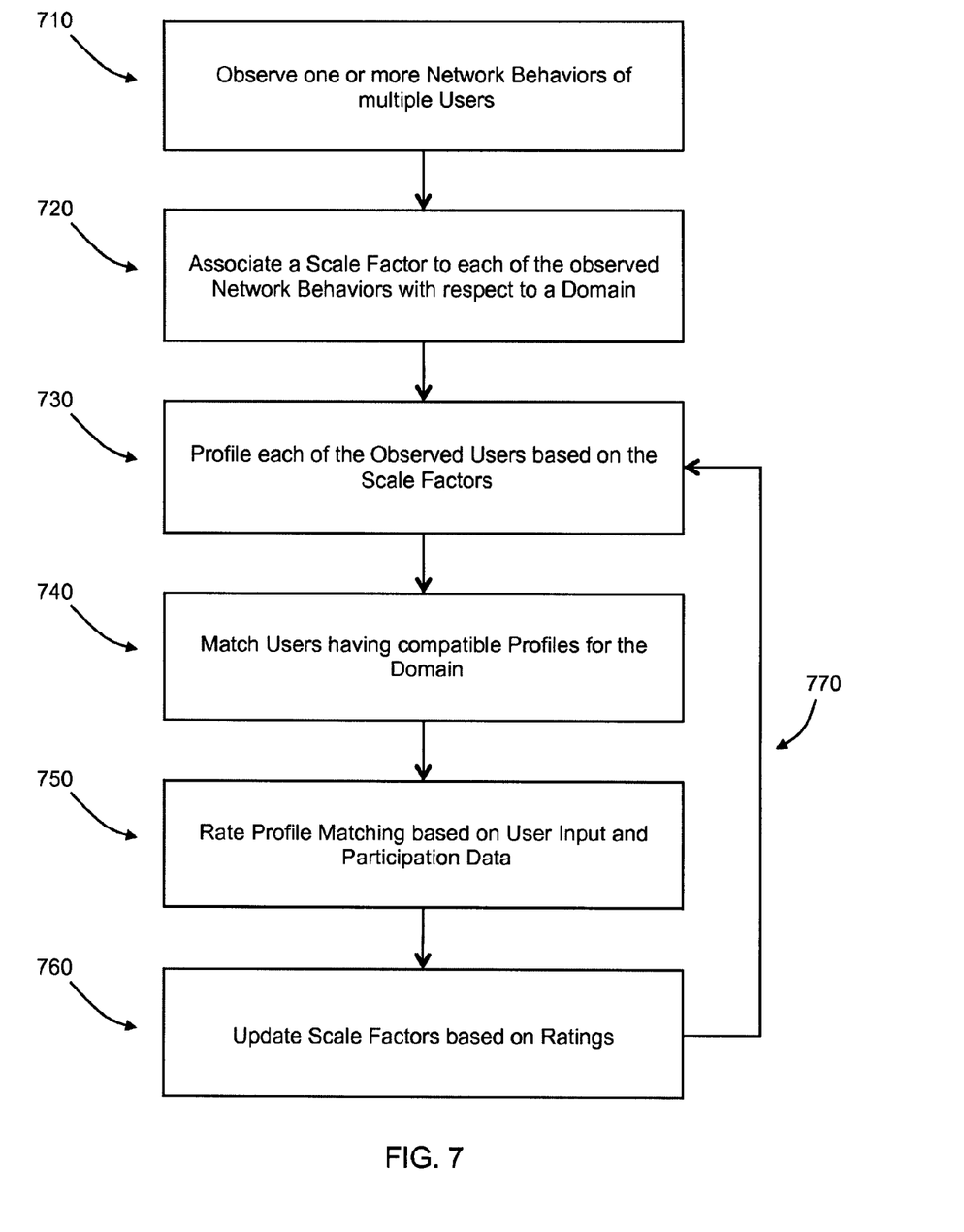
FIG. 7 shows a flow chart including profiling, profile matching, and profile updating according to the present invention.

It is important to note that the ratings can be used to update the profiles of the profiled users. In particular, the scale factors with respect to one or more domains can be raised or lowered based on the success of the profile matching as determined by the ratings. FIG. 7 shows a flow chart for an embodiment of the present invention with profile updating, including observing one or more network behaviors of users 710, associating a scale factor to each of the observed network behavior with respect to a domain 720, profiling each of the observed users based on the scale factors 730, matching users having compatible profiles 740, rate profile matching 750, and updating the scale factors based on the ratings 760. The updated scale factors can be used to update the user profiles 770. The ratings can also be used to measure the relevance of a network behavior with respect to one or more domains.

As one of ordinary skill in the art will appreciate, various changes, substitutions, and alterations could be made or otherwise implemented without departing from the principles of the present invention, e.g. the Internet can be replaced by a local area network (LAN), a wide area network (WAN), or any other communication network and a domain can include any activity, goal, need, and/or interest. Accordingly, the scope of the invention should be determined by the following claims and their legal equivalents.

While the invention has been particularly shown and described with reference to the preferred embodiments thereof, it will be understood by those skilled in the art that various changes in form and details may be made without departing from the scope of the invention.

The invention claimed is:

1. An application server for matching a plurality of users within a domain, said application server configured to:
   (A) implement a social network having a plurality of users;
   (B) observe network behaviors of at least some of said plurality of users of said social network;
   (C) develop profiles of at least some of said plurality of users within at least one of a plurality of domains using a profile function, wherein (i) said profile function defines a level of relevance of network behaviors for said domain, (ii) said profile function maps said observed network behaviors to said profiles for said domain and (iii) each of said profiles stores a descriptor representing one of said plurality of users for said domain; and (D) compute matches of two or more of said plurality of users with respect to one of said domains, wherein said matches are based on a relation of common descriptors of said profiles for said domain.

2. The application server according to claim 1, wherein said plurality of domains comprises at least one of an activity, a goal, a need and an interest.

3. The application server according to claim 1, further configured to:

(E) receive ratings of one or more of said matches from said plurality of users, wherein said rating is based on a combination of (i) one or more user inputs of said users having matched profiles and (ii) participation data of said users having matched profiles; and (F) update said profiles based on said ratings.

4. The application server according to claim 1, wherein said profiles comprise scale factors having a magnitude representing said level of relevance of said observed network behaviors for said domain.

5. The application server according to claim 4, wherein said magnitude of said scale factors are refined based on ratings received from said plurality of users.

6. The application server according to claim 1, wherein said profiles are developed with respect to one or more domains.

7. The application server according to claim 1, wherein (i) said observed network behaviors are represented by a matrix and (ii) said profiles are an association of said matrix with respect to said domain.

8. The application server according to claim 1, wherein said observed network behaviors are determined automatically based on actions, habits and preferences of each of said plurality of users.

9. The application server according to claim 8, wherein said actions, habits and preferences of said user are performed on a portable communication device.

10. The application server according to claim 8, wherein said actions, habits and preferences are based on data collected from sensors of a portable communication device.

11. The application server according to claim 1, wherein said observed network behaviors comprise a customization of an avatar.

12. The application server according to claim 1, wherein (i) said observed network behaviors comprise a selection of words from a word list and (ii) said words are associated with any combination of a value, a need and a goal.

13. The application server according to claim 1, wherein said observed network behaviors comprise a communication preferences between at least one of said plurality of users and a service provider.

14. The application server according to claim 1, wherein said level of relevance of said network behaviors across domains is updated in accordance to ratings provided by said plurality of users.

15. The application server according to claim 1, wherein content is (i) recommended in a first mode and (ii) presented in a second mode based on said profile and said domain.

16. The application server according to claim 1, wherein (i) friends and (ii) acquaintances are suggested based on said profile and said domain.

17. The application server according to claim 1, wherein one or more scale factors associate one or more of said network behaviors with one or more of said plurality of domains.

18. The application server according to claim 1, wherein (i) said profiles are updated and (ii) said updates are based on cumulative activity of said plurality of users.

19. The application server according to claim 18, wherein said cumulative activity updates said level of relevance of one or more of said network behaviors with respect to one or more of said domains.

\* \* \* \* \*